Nov. 5, 1963  H. Z. MARTIN  3,109,804
REFORMING AND HYDROFINING PROCESS
Filed Dec. 31, 1959
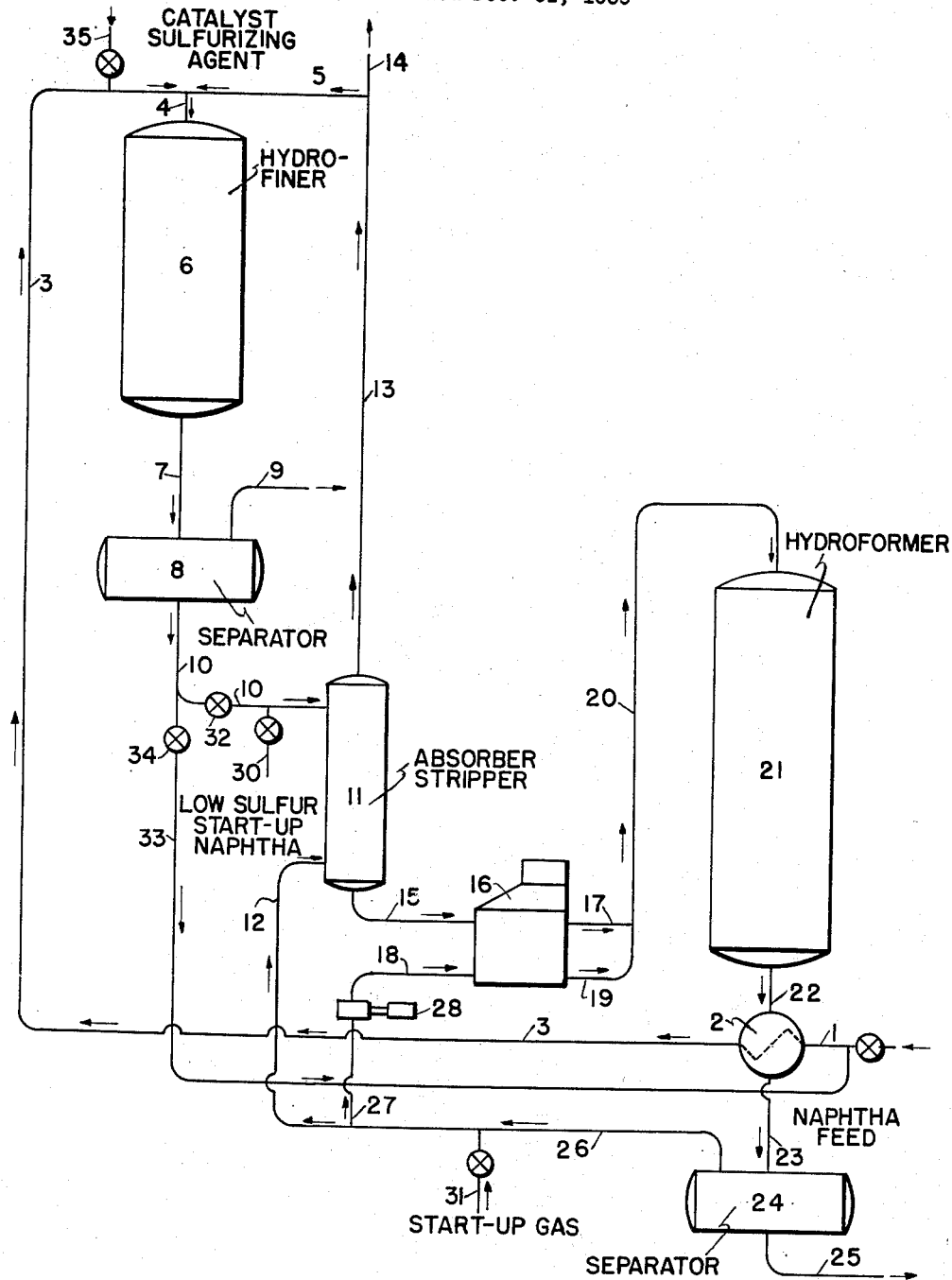
Homer Z. Martin
Inventor
By H. M. Feyrer
Patent Attorney

United States Patent Office 3,109,804
Patented Nov. 5, 1963

3,109,804
REFORMING AND HYDROFINING PROCESS
Homer Z. Martin, Westfield, N.J., assignor to Esso Research and Engineering Company, a corporation of Delaware
Filed Dec. 31, 1959, Ser. No. 863,303
8 Claims. (Cl. 208—89)

This invention relates to a reforming process and particularly to a process for hydroforming naphthas in contact with platinum on alumina catalysts. More specifically, this invention pertains to an integrated process for hydrofining a naphtha feed to lower or control its sulfur content and hydroforming the same in contact with a platinum on alumina catalyst.

Hydroforming naphtha feeds in contact with platinum alumina catalysts is a well-known and widely used process for increasing the octane number and generally improving the engine performance characteristics of the finished gasoline product. In view of the sensitivity of said catalysts to sulfur or sulfur compounds in the feed, it is ordinarily necessary to pretreat the feed to reduce the sulfur content to below about 40 parts per million. This is usually accomplished by subjecting the feed stock to hydrofining or treatment with hydrogen in the presence of a hydrodesulfurizing catalyst to convert sulfur compounds to hydrogen sulfide which is then stripped from the naphtha feed stock before charging the same to the hydroforming reactor.

A variety of catalysts have been proposed for such hydrofining including molybdenum oxide, nickel-tungsten sulfide and, most frequently, cobalt molybdate or mixtures of cobalt oxide and molybdenum oxide dispersed upon a support or carrier such as alumina. In general, such catalysts are prepared by first forming adsorptive alumina particles in any suitable way and then compositing molybdenum oxide and cobalt oxide therewith. The molybdenum oxide can be added as a slurry or it may be applied as a solution of ammonium molybdate. The cobalt oxide is conveniently added as a salt such as cobalt nitrate or acetate, salts which are readily decomposed to cobalt oxide and volatile materials. The cobalt oxide and molybdenum oxide may be provided in equimolar amounts or a molecular excess of one over the other may be used. Suitable catalysts contain from about 5 to about 25 wt. percent of cobalt oxide and molybdenum oxide with the ratio of the former to the latter in the range of from about one to five to about five to one.

The hydrofining of naphtha feed stocks is ordinarily effected by contacting the naphtha fraction with the aforesaid catalysts at temperatures of about 500 to 700° F. and pressures of about 50 to 500 p.s.i.g. The naphtha feed rate is about 0.1 to about 20, preferably about 4–5 volumes per volume of catalyst in the reactor per hour. Hydrogen or hydrogen-rich gas (containing at least about 65–70 volume percent hydrogen) is also passed through the hydrofining reaction zone at a rate of from about 30 to 3000 s.c.f./bbl. of feed. Under these conditions some hydrogen is consumed in the process. Hydrogen consumption rates are generally in the range of from about 1 to 20 s.c.f./bbl. of feed but may be as high as 150–600 s.c.f./bbl.

In the hydrofining process the sulfur compounds are largely converted to hydrogen sulfide which is thereupon stripped from the hydrofined material by condensing the same and separating the normally gaseous materials and then subjecting the condensate to distillation preferably combined with stripping with hydrogen containing gas which is thereupon used as the treat gas in the hydrofining step. The stripped naphtha should have a sulfur content of less than 40 parts per million and preferably should contain less than 10 parts per million of sulfur in order to be suitable for charging to the platinum hydroforming reaction zone. The hydrofining and stripping step will ordinarily also lower the nitrogen content of the hydrofined naphtha to below about 1 p.p.m. By supplying the hydrofined naphtha to the upper part of the stripping section of an absorber stripper which is maintained at about 175–200° F. it is further possible to lower the water content of the naphtha to below 10 parts per million. This is also advantageous in the subsequent step of hydroforming in contact with a platinum on alumina catalyst since the water tends to strip chlorine from the catalyst and the stripped chlorine is converted to HCl which causes excessive hydrocracking.

The hydroforming of the hydrofined naphtha feed is effected by contacting vaporized naphtha feed in admixture with hydrogen with a catalyst containing a platinum group metal dispersed or supported upon an alumina carrier. The preferred metal is platinum and is provided in amounts of from about 0.05 to 2.0 wt. percent, preferably about 0.3–0.6 wt. percent. Palladium, on the other hand, is ordinarily provided in somewhat greater amounts, i.e., 0.5 to 5.0 wt. percent. These catalysts are normally prepared by impregnating activated or adsorptive alumina with an aqueous solution of the platinum group metal compound, for example, chloroplatinic acid, platinum chloride, palladium chloride and the like. Ordinarily, therefore, these catalysts will contain an amount of halogen, preferably chlorine, at least equal to the amount of platinum group metal. The alumina support may be prepared in a variety of ways by forming alpha alumina monohydrate or the alpha or beta alumina trihydrate or mixtures of two or more of these hydrates in any of the many known ways whereupon the hydrate is dried and calcined at about 1000°–1400° F. to render the alumina adsorptive. It is preferred to use an alumina of a high degree of purity, preferably as is obtainable by the hydrolysis of aluminum alcoholate.

Hydroforming of the naphtha is effected at temperatures of from about 850–1000° F., pressures of from about 50 to about 750 p.s.i.g. and at feed rates of from about 0.1 to about 5.0 volumes of liquid naphtha feed per volume of catalyst per hour. Hydrogen or recycle process gas rich in hydrogen is charged to the hydroforming reaction zone at a rate of from about 2000 to 10,000 s.c.f./bbl. of naphtha feed. While the hydroforming reaction zone can be operated as a fixed bed, moving bed or fluidized solids bed, it is ordinarily preferred to utilize fixed beds of catalyst in several vessels arranged in series with means for reheating the reaction mixture between vessels.

The present invention pertains to the operation of such a hydrofining-hydroforming combination process in a highly integrated system, i.e. one in which the feed to the hydrofiner is heated by indirect heat exchange with hydroformer product and in which the excess or make-gas from the hydroformer is used as the gas for stripping the hydrofined product and also as the treat gas in the hydrofining step. Specifically, this invention is concerned with a method for placing such a combination system on stream and effectively activating the hydrofining catalyst.

Reference is made to the accompanying drawing which illustrates, diagrammatically, a flow plan of an integrated hydrofining-hydroforming reaction system in accordance with this invention.

Naphtha feed is supplied to the system via inlet line 1 and is passed through feed-hydroformer product heat exchanger 2 and thence via line 3 to inlet line 4 to the hydrofiner 6. Hydrogen or hydrogen-containing treat gas is supplied via line 5 to inlet line 4 and thence to the hydrofiner. The hydrofiner is charged with the catalyst and is normally operated under the conditions disclosed above. The hydrofined product is withdrawn via line 7 scrubbed flue gas, or preferably dry hydrogen, is passed through inlet line 31 to preheat furnace 16 and thence into the hydroformer 21 in order to gradually bring the catalyst up to reaction temperature of about 875–950° F.

Charge naphtha feed is withdrawn from crude distillation at about 300° F. and circulated through the hydrofiner, the separator 8 and recycle line 33, bypassing the absorber-stripper 11 and hydroformer 21.

As the hydroformer approaches reaction temperature, hydrogen or hydrogen-rich process gas is supplied through line 31 and charged to the preheat furnace and thence to the hydroformer. A low sulfur startup naphtha containing less than 40 and preferably less than 10 p.p.m. of sulfur is charged through inlet line 30, and line 10 to the top of the absorber stripper and thence to the preheat furnace 16 for heating to reaction temperature for charging to the hydroformer. With fresh or freshly regenerated platinum-alumina hydroforming catalysts it is preferable to keep the preheat temperature relatively low, i.e. at about 850–875° F. Hydrogen containing gas supplied to or produced in the hydroformer is separated from the normally liquid products in separator 24 and recycled to the hydroformer via lines 26, 27, compressor 28, line 18, preheater 16 and lines 19 and 20.

A portion of the hydrogen-rich gas removed from separator 24 is charged via line 12 to the absorber stripper 11 and thence via lines 13 and 5 to the hydrofiner 6. When recycle or treat gas is available for or charged to the hydrofiner, carbon disulfide is added to the feed or recycle naphtha in order to activate the hydrofining catalyst. Usually about 0.1 to 1.0 wt. percent, preferably 0.6 wt. percent, of carbon disulfide based on the naphtha feed is added to the feed and is continued for at least 24 hours. The carbon disulfide added to the feed during activation is essentially quantitatively converted to $H_2S$. All this $H_2S$ is bled from separator drum 8 via line 9 after an equilibrium concentration of $H_2S$ has built up in the circulating hydrofinate. Depending on the temperature and pressure, this equilibrium may be about 0.1 wt. percent $H_2S$. This procedure will give a catalyst activity essentially the same as obtained under the more ideal pilot plant optimum activation described above. The total amount of sulfur adsorbed by the catalyst under these conditions corresponds to about 20–30 wt. percent of the stoichiometric quantity necessary for the conversion of the metal oxides on the catalyst to sulfides ($CoS$, $MoS_2$). The total amount of sulfur added for preactivation should be more than 100% and up to about 1500% of the stoichiometric quantity necessary to convert the cobalt oxide and molybdenum oxide to the corresponding sulfides. Lower alkyl mercaptans such as ethyl mercaptan and the like could also be used as the sulfiding agent in place of carbon disulfide. By way of contrast it is noted that preactivation of the catalyst with a high sulfur naphtha feed, i.e., containing about 740 p.p.m. sulfur would require an activation of up to 250 hours to attain a much lower level of activity than is attainable with carbon disulfide.

The following example is illustrative of the present invention.

*Example*

The above procedure was carried out in a 20,000 b./d. commercial powerformer-hydrofiner combination. During the presulfiding operations, conditions in the hydrofiner circuit were as follows:

| | |
|---|---|
| Hydrofinate recycle _____b./d__ | 16,000 |
| Treat gas rate _____s.c.f./b__ | 440 |
| Hydrofiner temperature _____° F__ | 545 |
| Hydrofiner pressure _____p.s.i.g__ | 190 |
| $CS_2$ addition rate _____g.p.h__ | 75 |
| Length of entire operation _____hours__ | 40 |
| Percent Sulfur in inlet Stream to hydrofiner _____wt. percent__ | 0.41 |

The 0.41 wt. percent sulfur in the hydrofiner feed was made up of 0.31 wt. percent sulfur from $CS_2$ addition and 0.1 wt. percent sulfur as $H_2S$ in the circulating hydrofinate.

After presulfiding, $CS_2$ addition was stopped, and the $H_2S$ concentration in the circulating naphtha allowed to decrease. Normal feed was then cut into the hydrofiner circuit and conventional operation begun.

Operation of the hydrofiner was considerably improved by this treatment. Before presulfiding, the sulfur reduction across the freshly regenerated hydrofiner was only 60 down to 32 p.p.m. Samples taken up to 2 months after presulfiding showed that the hydrofinate now contained only 6 p.p.m. of sulfur with the same 60 p.p.m. feed and hydrofiner operating conditions. Hydrofiner conditions were:

| | |
|---|---|
| Feed rate _____b./d__ | 15,000 |
| Treat gas rate _____s.c.f./b__ | 500 |
| Temperature _____° F__ | 550 |
| Pressure _____p.s.i.g__ | 220 |

The foregoing description contains a limited number of embodiments of the present invention. It will be understood that variations are possible without departing from the scope of the following claims.

What is claimed is:

1. In the operation of an integrated hydrofiner employing a cobalt oxide-molybdenum oxide-on-alumina catalyst and a hydroformer employing a platinum group metal-on-alumina catalyst, the improvement in activating said oxide-on-alumina catalyst which comprises in combination, charging a low sulfur naphtha feed and hydrogen to the hydroformer at normal hydroformer conditions; withdrawing reaction products from the hydroformer, cooling the same, and separating normally liquid hydroformed products from hydrogen-rich gas, recycling a portion of said gas to the hydroformer, charging fresh high sulfur naphtha feed and a portion of the hydrogen-containing gas separated from said hydroformer products to the hydrofining reaction zone at normal hydrofining conditions, adding 0.1 to 1.0 wt. percent of a sulfiding agent based on high sulfur naphtha feed and selected from the group consisting of $CS_2$ and lower alkyl mercaptans to said hydrofining reaction zone, cooling the effluent from the hydrofiner to condense the liquid products, separating the liquid products from the gaseous products, withdrawing the latter from the system and recycling the liquid products containing said sulfiding agent to said hydrofining reaction zone until said oxide-on-alumina catalyst has absorbed from about 20 to 30 wt. percent of the stoichiometric quantity of sulfur necessary to convert said oxide-on-alumina catalyst to sulfide.

2. The process as defined in claim 1 in which said sulfiding agent is carbon disulfide.

3. The process as defined in claim 1 in which said low sulfur naphtha charged to the hydroformer contains less than 40 p.p.m. sulfur and the feed charged to the hydrofiner contains more than 40 p.p.m. sulfur.

4. In the operation of an integrated hydrofiner employing a cobalt oxide-molybdenum oxide-on-alumina catalyst and a hydroformer employing a platinum group metal-on-alumina catalyst, the improvement in activating said oxide-on-alumina catalyst which comprises in combination charging a low sulfur naphtha feed and hydrogen to the hydroformer at normal hydroforming conditions, withdrawing reaction products from the hydroformer, cooling the same and separating normally liquid hydroformed products from hydrogen-rich gas, recycling a portion of said gas to the hydroformer, charging fresh, high sulfur naphtha feed and a portion of said hydrogen-containing gas separated from the hydroformer products to the hydrofining reaction zone at normal hydrofining conditions, adding 0.1 to 1.0 wt. percent of a sulfiding agent based on naphtha feed and selected from the group consisting of lower alkyl mercaptans and $CS_2$ to said hydrofining reaction zone, cooling the effluent from the hydrofiner to condense the liquid products substantially saturated with hydrogen sulfide, separating said liquid products from the gaseous products, withdrawing the gaseous products from the system, recycling the liquid products saturated with hydrogen sulfide to said hydrofining reaction zone until said oxide-on-alumina catalyst has reacted with from about 20 to 30 wt. percent of the stoichiometric quantity of sulfur necessary to convert said oxide-on-alumina catalyst to the corresponding sulfide, and wherein the quantity of said sulfur contained in the total of said sulfiding agent is from 100% to 1500% of the stoichiometric quantity needed to convert said oxide-on-alumina catalyst to said corresponding sulfides, allowing the hydrogen sulfide content of the recycle naphtha to drop to a normal level, charging fresh high sulfur naphtha feed to the hydrofiner, discontinuing the recycling of the hydrofined liquid products and charging the same to the hydroformer and discontinuing the direct charging of low sulfur naphtha to the hydroformer.

5. The process as defined in claim 4 in which the sulfiding agent is carbon disulfide.

6. The process as defined in claim 4 in which the low sulfur naphtha first charged to the hydroformer contains less than 40 p.p.m. sulfur and the feed charged to the hydrofiner contains more than 40 p.p.m. sulfur.

7. The process as defined in claim 4 in which the low sulfur naphtha is charged to an absorber stripper for contact with hydroformer recycle gas before the naphtha is charged to the hydroformer and the overhead gas from the absorber stripper is charged as treat gas to the hydrofiner.

8. The process as defined in claim 7 in which hydrofined liquid products on discontinuance of the recycling operation are charged to the absorber stripper and the direct supply of low sulfur naphtha to the absorber-stripper is stopped.

References Cited in the file of this patent
UNITED STATES PATENTS

| | | |
|---|---|---|
| 2,620,362 | Stiles | Dec. 2, 1952 |
| 2,773,007 | Gerhold | Dec. 4, 1956 |
| 2,969,316 | Stanford et al. | Jan. 24, 1961 |